UNITED STATES PATENT OFFICE.

ISIDOR POLLAK, OF VIENNA, AUSTRIA-HUNGARY, ASSIGNOR TO THE FIRM OF ERSTE WIENER EXPORT-MALZFABRIK HAUSER & SOBOTKA, OF VIENNA, AUSTRIA-HUNGARY.

SOLIDIFIED DIASTATIC MALT EXTRACTS.

No. 853,934.     Specification of Letters Patent.     Patented May 14, 1907.

Application filed May 25, 1906. Serial No. 318,684.

*To all whom it may concern:*

Be it known that I, ISIDOR POLLAK, a subject of the Emperor of Austria, residing at Vienna, Austria-Hungary, have invented certain new and useful Improvements in Solidified Diastatic Malt Extracts, of which the following is a specification.

The diastatic malt extracts occurring in commerce in liquid form of a syrupy consistency, which are much used in the bread making industry, are deficient as regards their durability in that they are readily subject to fermenting action when coming in contact with the various germs of wild ferments always present in the atmosphere, and in addition they constitute a favorable culture bed for the development of certain mold fungi. It has been sought to overcome this disadvantage by endeavoring to reduce to dryness the diastatic malt extracts *in vacuo*, but satisfactory results could not be obtained by this means, as the extracts, when evaporated down to a content of water of about 10 per cent. retain these last particles of water with such tenacity that for the removal thereof, even *in vacuo*, a temperature, such as from 55° to 65° C is necessary, at which the diastatic action of the product is reduced to a minimum. In addition, the products prepared in this manner are so strongly hygroscopic that they immediately take up moisture during the opening and closing of their receptacle and during use and can consequently only be properly preserved in perfectly hermetically closed vessels.

The present invention relates to a product of high or unlimited durability obtained from diastatic malt extracts by converting them into a solid form in such manner that the concentrated diastase extracts are kneaded together with malt flour (finely ground meal of germinated cereals) to form a stiff dough, whereby a product is obtained which is practically not hygroscopic, and, as compared with the original syrup-like products, shows an increased diastatic action.

It has already been proposed to mix concentrated non-diastatic malt extracts with flour made of non-germinated cereals or of starch and to dry this mixture. As compared with the products obtained by this method of operating the above described product possesses the essential advantage that in addition to representing a durable form of the diastatic extracts it shows also a considerable increase of the valuable diastatic action of the said extracts, as the malt flour added to the extracts according to this invention contains a considerable amount of diastase. Moreover the product constituting the present invention is distinguished from that obtained by the use of flour of non-germinated cereals by the fact that by adding malt flour to concentrated diastase extracts no mere mixing together is intended but that a chemical process is brought about, which is explained by the following facts.

As is known, diastase can only have a converting action upon starchy materials when a sufficient quantity of water is present. If the flours rich in diastase produced from germinated cereals are brought together with liquid concentrated malt extracts at a temperature of about 60° C, the quantity of water present in the extract is absorbed by the dry flour rich in diastase, while at the same time the hydrating of the starch by the diastase commences. In this two molecules of starch are converted into dextrines and malt dextrines in taking up one molecule of water through the medium of the diastase and are finally converted into maltose according to the following reaction:

$$2C_6H_{10}O_5 + H_2O = C_{12}H_{22}O_{11}.$$

There is obtained by this means a plastic almost dry homogeneous mass of very high content of diastase, much higher in fact than the extracts employed and of unlimited durability, and which after standing for some time *in vacuo* becomes quite hard and capable of being pulverized.

For practically preparing the product which forms the object of the present invention, the liquid concentrated diastase extracts obtained in the known manner are kneaded together with from 30 to 40 per cent. of malt flour, to form a dough, which can be molded as desired and which has about the consistency of pressed yeast. The product thus obtained can be stored for any length of time and can, of course, be manipulated much more simply and cleanly than the syrup-like extracts.

If required the product prepared as above described can be dried *in vacuo* and be then reduced to powder and brought into commerce in this form.

What I claim as new and desire to secure by Letters Patent is as follows:

Solidified diastatic malt extracts of high durability, consisting of an intimate mixture of the well known liquid concentrated diastatic malt extracts with malt flour, that is finely ground meal of germinated cereals, such mixture forming a stiff dough which can be molded to any desired form and which possesses an increased diastatic action as compared with the liquid extracts employed as a constituent thereof.

In testimony whereof I have hereunto set my hand in presence of two subscribing witnesses.

ISIDOR POLLAK.

Witnesses
 JOSEF RUBASCH
 ALVESTO S. HOGUE.